United States Patent
Kuok et al.

(10) Patent No.: US 9,240,691 B2
(45) Date of Patent: Jan. 19, 2016

(54) SYSTEM, METHOD, AND COMPUTER PROGRAM PRODUCT FOR REMEDYING A CHARGING ERROR

(75) Inventors: Chong Kin Kuok, Belmont, CA (US); Paul Gerard Melucci, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 511 days.

(21) Appl. No.: 13/592,255

(22) Filed: Aug. 22, 2012

(65) Prior Publication Data

US 2014/0055099 A1    Feb. 27, 2014

(51) Int. Cl.
*H02J 7/04* (2006.01)
*H02J 7/16* (2006.01)
*H02J 7/00* (2006.01)

(52) U.S. Cl.
CPC ....... *H02J 7/0004* (2013.01); *H02J 2007/0001* (2013.01)

(58) Field of Classification Search
CPC ......... H02J 7/0029; H02J 7/00; H02J 7/0091; H02J 7/045; H02J 7/0004; H02J 7/0052; H02J 7/0093; H02J 2007/0037; H02J 2007/0039; H02J 2007/004; H02J 2007/0098; H02J 7/0008; H02J 7/007; H02J 7/0075; H02J 7/0077; H02J 2007/0001; H01M 10/44; H01M 10/486
See application file for complete search history.

(56) References Cited

U.S. PATENT DOCUMENTS

| 6,495,989 | B1 | 12/2002 | Eguchi | |
|---|---|---|---|---|
| 2003/0184256 | A1* | 10/2003 | Kopf et al. | 320/101 |
| 2007/0257642 | A1 | 11/2007 | Xiao et al. | |
| 2009/0085528 | A1* | 4/2009 | Yamada | 320/160 |
| 2010/0013430 | A1* | 1/2010 | Manor et al. | 320/106 |
| 2010/0198440 | A1 | 8/2010 | Fujitake | |
| 2011/0018500 | A1* | 1/2011 | Takahashi | 320/148 |
| 2012/0139482 | A1* | 6/2012 | Zhang et al. | 320/107 |

FOREIGN PATENT DOCUMENTS

| CN | 101432946 A | 5/2009 |
|---|---|---|
| CN | 101803146 A | 8/2010 |
| TW | I226738 A | 1/2005 |
| TW | 200849766 A | 12/2008 |

OTHER PUBLICATIONS

Office Action from Taiwan Patent Application No. 102128509, dated Jan. 6, 2015.
Office Action from Chinese Patent Application No. 201310369402.4, dated Mar. 31, 2014.
Office Action from Taiwan Patent Application No. 102128509, dated Sep. 2, 2015.

* cited by examiner

*Primary Examiner* — Nha Nguyen
(74) *Attorney, Agent, or Firm* — Zilka-Kotab, PC

(57) ABSTRACT

A system, method, and computer program product are provided for remedying a charging error. In use, a battery and a battery charger are identified. Additionally, an error associated with the charging of the battery by the battery charger is detected. Further, the error is remedied.

14 Claims, 5 Drawing Sheets

SYSTEM, METHOD, AND COMPUTER PROGRAM PRODUCT FOR REMEDYING A CHARGING ERROR

FIELD OF THE INVENTION

The present invention relates to batteries, and more particularly to charging batteries.

BACKGROUND

Batteries have become an essential power source for many portable electronics. For example, portable computers and other devices may use battery power to operate. However, current techniques for charging device batteries have been associated with various limitations.

For example, batteries that store a predetermined voltage may not be recognized by a charger if their stored voltage drops significantly from that predetermined voltage. This may result in the charger not charging the battery. There is thus a need for addressing these and/or other issues associated with the prior art.

SUMMARY

A system, method, and computer program product are provided for remedying a charging error. In use, a battery and a battery charger are identified. Additionally, an error associated with the charging of the battery by the battery charger is detected. Further, the error is remedied.

DETAILED DESCRIPTION

Figure 1:
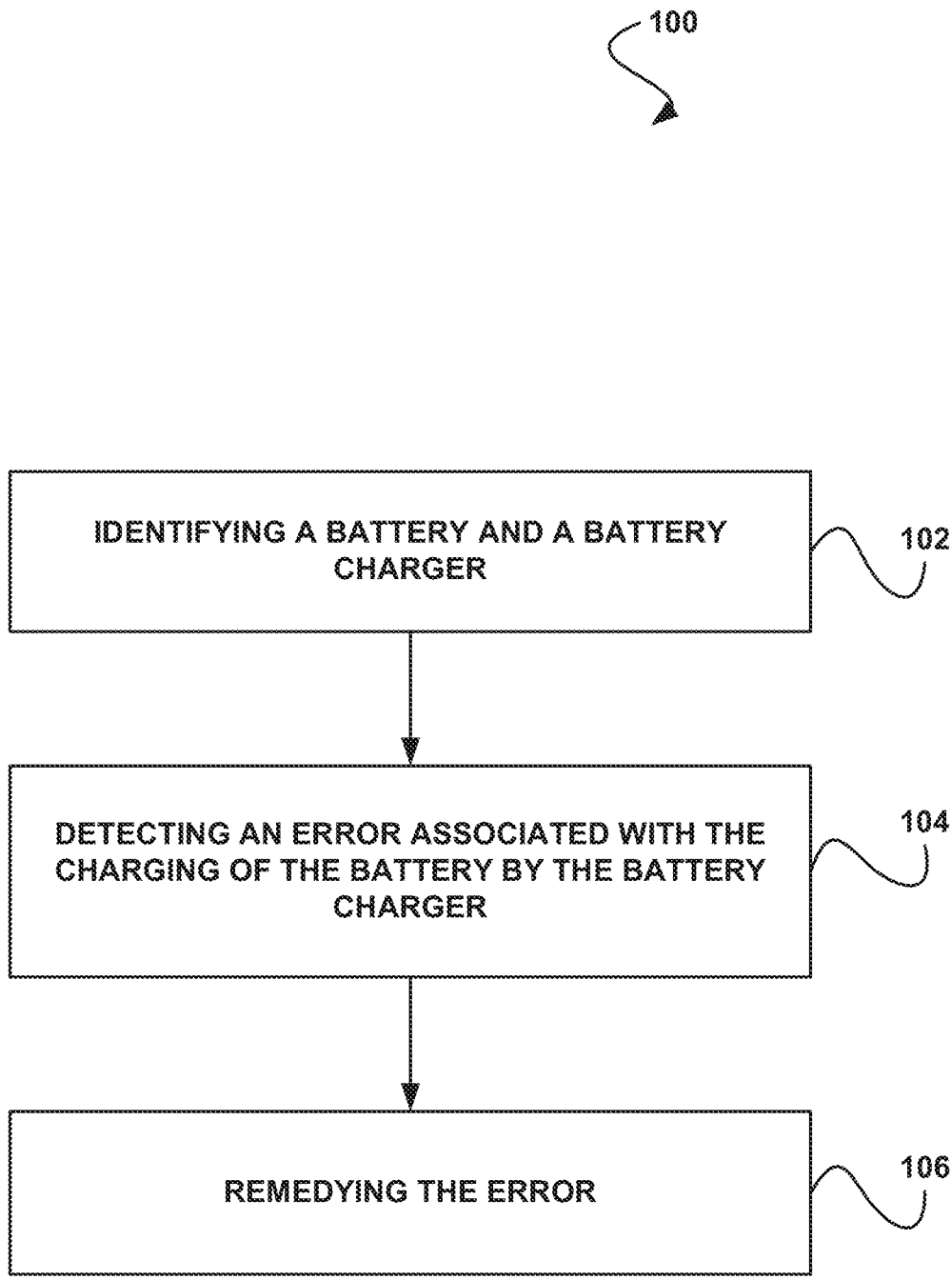
FIG. 1 shows a method for remedying a charging error, in accordance with one embodiment.

FIG. 1 shows a method 100 for remedying a charging error, in accordance with one embodiment. As shown in operation 102, a battery and a battery charger are identified. In one embodiment, the battery may include a rechargeable battery (e.g., a secondary battery, etc.). For example, the battery may include a lead acid battery, a nickel-cadmium (NiCd) battery, a nickel-zinc (NiZn) battery, a nickel metal hydride (NiMH) battery, a lithium-ion (Li-ion) battery, etc. Of course, however, the battery may include any battery capable of being charged by the charger.

Additionally, in one embodiment, the battery charger may charge the battery. For example, the battery charger may force an electric current through the battery in order to increase the voltage being stored by the battery. In another embodiment, the battery may be included within a device. For example, the battery may be permanently or removably coupled to a device (e.g., a portable computer, portable viewing glasses, a portable handheld device, etc.)

In yet another embodiment, the battery charger may also be included within the device. For example, the battery charger may be included within the device and may charge the battery when connected to a power source (e.g., when connected to a wall power outlet via a cable, etc.). In still another embodiment, the battery charger may be separate from the device and may be connected to the device using a cable or other transmission medium.

Further, as shown in operation 104, an error associated with the charging of the battery by the battery charger is detected. In one embodiment, the error may be detected as a result of monitoring one or more of the battery and the battery charger. For example, the battery may be monitored such that a current voltage held by the battery is determined. In another example, the battery charger may be monitored in order to determine whether the battery charger is currently providing a charge to the battery (e.g., by forcing an electric current through the battery, etc.). In still another example, the battery charger may be monitored in order to determine an amount of current being provided to the battery. In another embodiment, the error may be detected by hardware and/or firmware logic located in a circuit associated with the battery (e.g., a battery charging circuit, etc.). In yet another embodiment, the error may be detected by hardware and/or firmware logic located in a circuit external to the battery (e.g., an external hardware/firmware block, etc.).

Further still, in one embodiment, the monitoring may be performed on a periodic basis. For example, the monitoring may be performed at a predetermined interval, according to a schedule, etc. In another embodiment, the monitoring interval may be adaptable if charging has not commenced. In yet another embodiment, the monitoring may be performed in response to an event. For example, the monitoring may be performed when a connection to a power source is detected (e.g., when it is detected that the battery charger is connected to the power source and it is detected that the battery charger is capable of providing current to the battery, etc.). In another example, the monitoring may be performed when a connection between the battery charger and the battery is detected.

In another embodiment, the monitoring may be performed by a module. For example, the monitoring may be performed by a microcontroller that is in communication with both the battery and the battery charger. In yet another embodiment, the module may be included within the device. In still another embodiment, the module may be included within one or more of the battery and the battery charger. In yet another embodiment, the module may be separate from the device and may be connected to the device using a cable or other transmission medium. In another embodiment, the module may reside between the battery charger and the battery.

Also, in one embodiment, the error associated with the charging of the battery by the battery charger may indicate that the battery is not currently being charged by the battery charger. In another embodiment, the error may indicate that the battery is not fully charged by the battery charger. In yet another embodiment, the error may be detected if one or more criteria are determined to be met. For example, the error may be detected if a currently measured voltage of the battery is below a predetermined threshold.

In another example, the error may be detected if the current being currently provided by the battery charger to the battery is below a predetermined threshold. In still another example, the error may be detected if it is determined that the currently measured voltage of the battery is below a predetermined threshold and the battery charger is connected to the battery and capable of charging the battery but is not currently charging the battery.

For instance, the battery charger may include circuitry that detects the voltage of the battery and initiates a flow of current to the battery when the current voltage of the battery is determined to be within a predetermined range. However, the voltage currently held by the battery may be below the range that is detectable by the battery charger, and as a result, the battery charger may not recognize that it is currently connected to the battery and may therefore not send current to the battery to charge the battery.

In addition, as shown in operation 106, the error is remedied. In one embodiment, remedying the error may include sending a pulse to the battery. For example, remedying the error may include sending a current or voltage pulse to the battery. In another embodiment, the pulse may have one or more predetermined characteristics. For example, the pulse may have one or more of a predetermined or adaptable (e.g., dynamic, etc.) pulse width, a predetermined or adaptable rise time, a predetermined or adaptable frequency (e.g., repetition rate, etc.), a predetermined or adaptable amplitude, etc. In yet another embodiment, the characteristics of the pulse may be adjustable, may be dynamic, etc.

Furthermore, in one embodiment, the pulse may increase the voltage being held by the battery. For example, the pulse may charge the battery such that the voltage of the battery increases. In another embodiment, in response to the increased voltage of the battery due to the pulse, the battery charger may initiate charging of the battery. For example, if the voltage previously held by the battery was below the range detectable by the battery charger, the increased voltage of the battery due to the pulse may be within the range detectable by the battery charger. As a result, the battery charger may detect the battery, may determine that the currently measured voltage of the battery is below a predetermined threshold (e.g., that the battery does not contain a full charge, etc.), and may proceed with charging the battery.

Further still, in one embodiment, the pulse may be sent to the battery from the module that performed the monitoring of the battery. For example, the pulse may be sent to the battery from the microcontroller in communication with both the battery and the battery charger. In another embodiment, the current used to create the pulse may be provided by the battery charger via the power source. For example, the microcontroller may direct current from the battery charger to create the pulse for the battery. In yet another embodiment, the current used to create the pulse may be provided by a power source other than the battery charger and its connected power source.

Also, in one embodiment, the pulse may be repeatedly sent to the battery until it is determined that a voltage of the battery has exceeded a predetermined threshold. For example, the voltage of the battery may be monitored, and the pulse may be sent to the battery at a predetermined interval (e.g., every second, etc.) until the monitored voltage of the battery reaches the predetermined threshold. In another embodiment, the pulse may be sent to the battery a predetermined number of times (e.g., one, two, three, etc.).

In this way, it may be ensured that a battery having less than a desired charge is currently being charged by the battery charger. Additionally, a battery with a current charge that is not detectable by the battery charger may have its current charge adjusted such that it is detectable by the battery charger.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
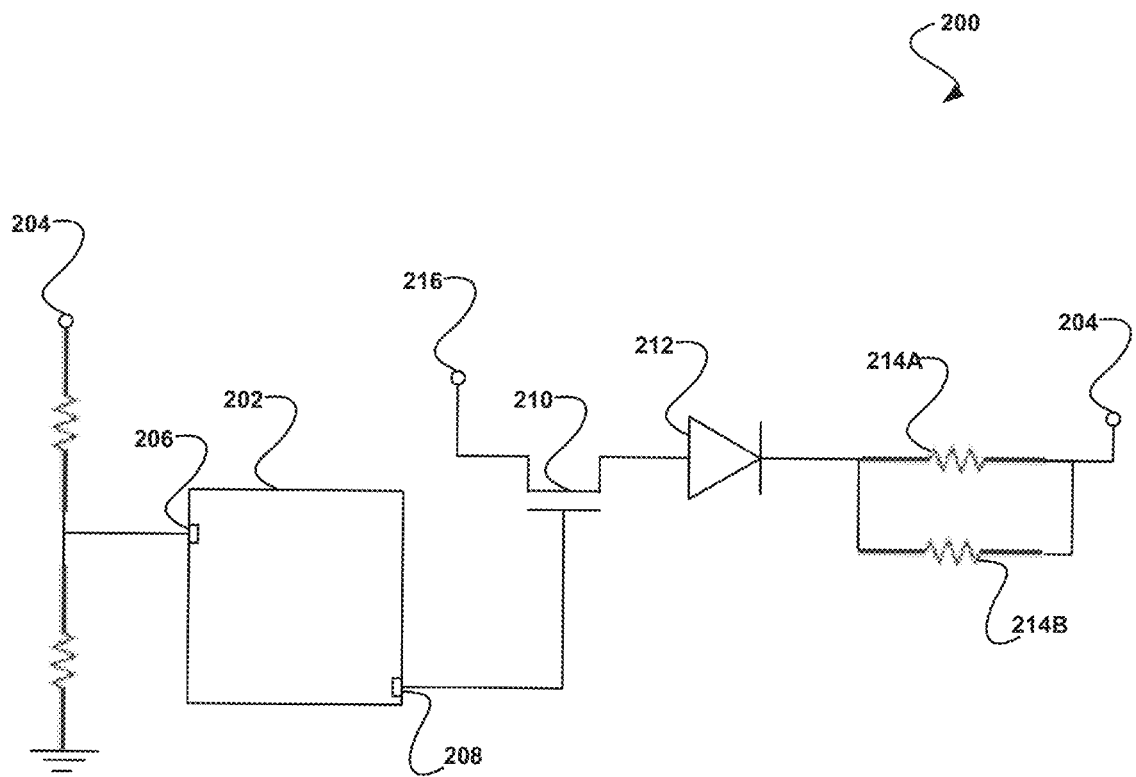
FIG. 2 shows an exemplary battery detection and charge trigger, in accordance with another embodiment.

FIG. 2 shows an exemplary battery detection and charge trigger 200, in accordance with another embodiment. As an option, the battery detection and charge trigger 200 may be carried out in the context of the functionality of FIG. 1. Of course, however, the battery detection and charge trigger 200 may be implemented in any desired environment. It should also be noted that the aforementioned definitions may apply during the present description.

As shown, the battery detection and charge trigger 200 includes a microcontroller 202 that monitors the voltage of a battery 204, utilizing an analog to digital converter (ADC) 206. In one embodiment, the ADC 206 may convert an analog voltage reading obtained from the battery 204 to a digital measurement that may be utilized by the microcontroller 202. In another embodiment, the microcontroller 202 may take the converted voltage input obtained via the ADC 206 and may compare it to a threshold. For example, the microcontroller 202 may compare the input voltage to a minimum voltage threshold.

Additionally, in one embodiment, if the microcontroller determines that the input voltage received via the ADC 206 is less than the minimum voltage threshold, a pulse of current may be generated by the microcontroller. For example, the pulse may be generated by a power supply in communication with the microcontroller 202. In another example, the pulse may be generated by the microcontroller 202 itself. In another embodiment, the pulse generated by the microcontroller 202 may be transmitted via a general purpose input/output (GPIO) port 208 of the microcontroller 202 to the battery 204.

More specifically, in one embodiment, the pulse may originate at the GPIO port 208 of the microcontroller and may pass through a p-channel field effect transistor (FET) 210 to a diode 212, and then through resistors 214A and 214B to the battery 204. In one embodiment, the resistors 214A and 214B may control a magnitude of the pulse that is sent to the battery 204. In another embodiment, a resistance of the resistors 214A and 214B may be adjusted in order to alter the strength of the pulse that is sent to the battery 204.

Further, in one embodiment, a voltage of the battery 204 may be increased in response to the receipt of the pulse from the microcontroller 202. In another embodiment, the microcontroller 202 may determine the current voltage of the battery 204 after the pulse has been delivered to the battery 204 by monitoring the battery 204 via the ADC 206 of the microcontroller 202. In yet another embodiment, if it is determined that the current voltage of the battery 204 is still less than the minimum voltage threshold, the microcontroller 202 may send an additional pulse to the battery 204.

Further still, in one embodiment, if it is determined that the current voltage of the battery 204 is greater than the minimum voltage threshold, the microcontroller 202 may not send an additional pulse to the battery 204. In another embodiment, the battery charger 216 may not detect the battery 204 if the current voltage of the battery is below the minimum voltage threshold. In yet another embodiment, the battery charger 216 may detect the battery 204 and proceed to charge the battery 204 until the battery 204 reaches a maximum voltage threshold if the current voltage of the battery 204 is above the minimum voltage threshold but below the maximum voltage threshold.

In this way, if the battery 204 has a current charge that is below the detectable range of the battery charger 216, the microcontroller 202 may kick start the battery 204 by sending a pulse charge to the battery 204 such that the current charge is increased to a level where the battery charger 216 may detect the battery 204 and begin to charge the battery 204.

Figure 3:
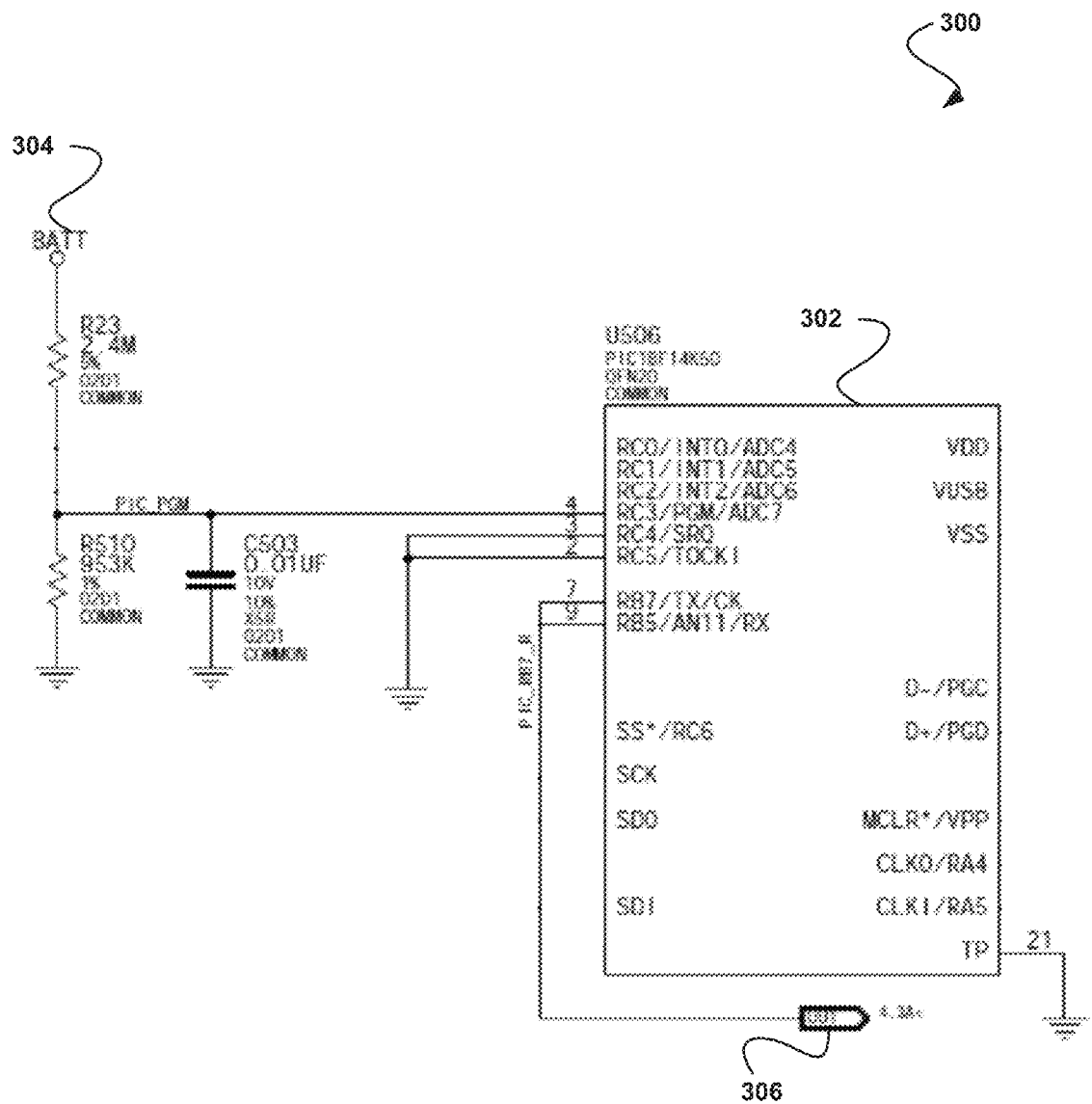
FIG. 3 shows exemplary battery monitoring circuitry, in accordance with another embodiment.

FIG. 3 shows exemplary battery monitoring circuitry 300, in accordance with another embodiment. As an option, the exemplary battery monitoring circuitry 300 may be carried out in the context of the functionality of FIGS. 1-2. Of course, however, the exemplary battery monitoring circuitry 300 may be implemented in any desired environment. It should also be noted that the aforementioned definitions may apply during the present description.

As shown, the battery monitoring circuitry 300 includes a U506 microcontroller 302 that monitors a battery 304. In one embodiment, the U506 microcontroller 302 may detect the current voltage held by the battery 304. In another embodiment, the U506 microcontroller 302 may compare the currently detected voltage held by the battery 304 to a predetermined voltage (e.g., a threshold voltage, etc.). In yet another embodiment, if the U506 microcontroller 302 determines that the currently detected voltage held by the battery 304 is less than the predetermined voltage, the U506 microcontroller 302 may trigger a pulse to be sent from the U506 microcontroller 302 via an output 306.

Figure 4:
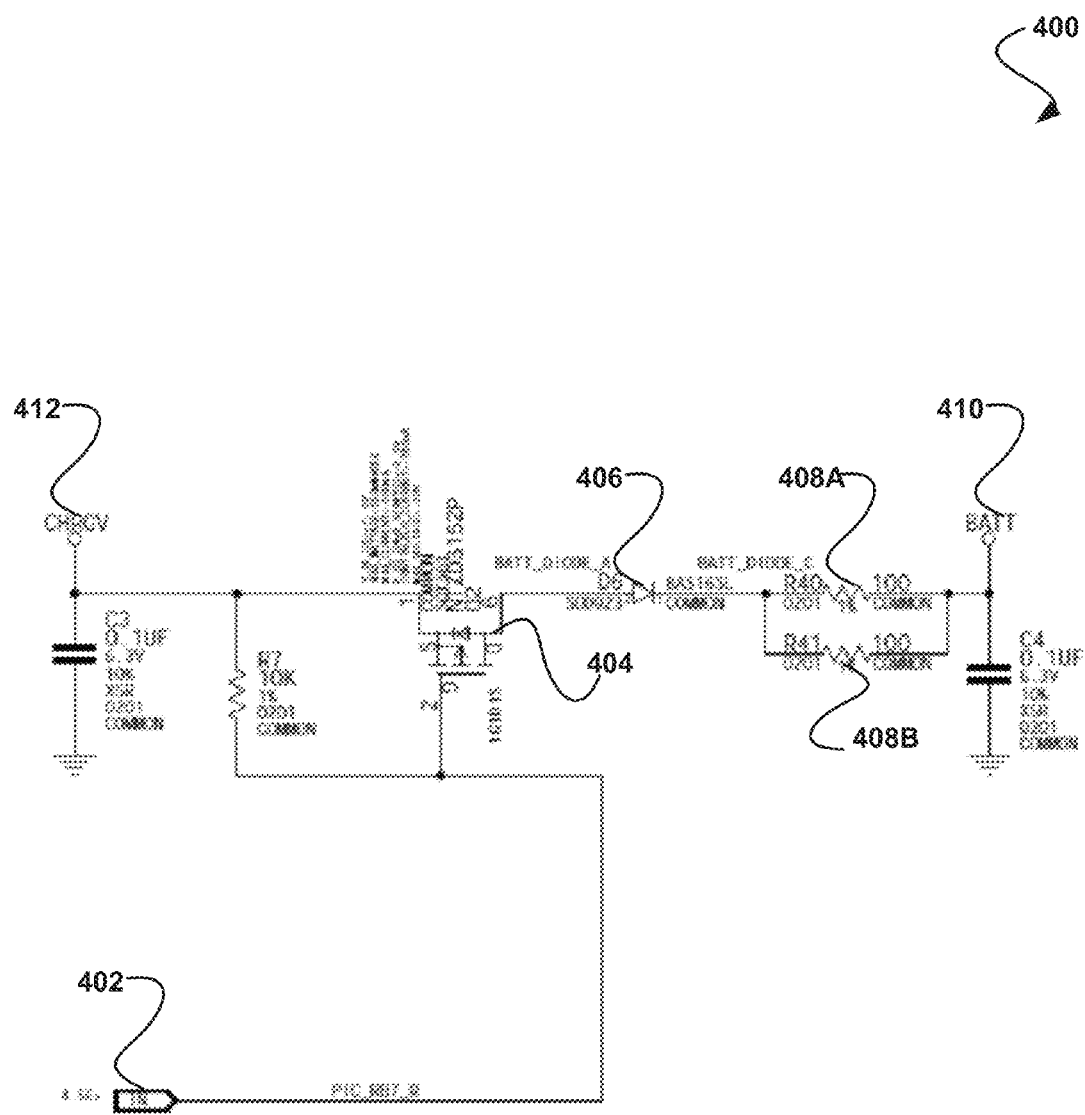
FIG. 4 shows exemplary battery kick start circuitry, in accordance with another embodiment.

FIG. 4 shows exemplary battery kick start circuitry 400, in accordance with another embodiment. As an option, the exemplary battery kick start circuitry 400 may be carried out in the context of the functionality of FIGS. 1-3. Of course, however, the exemplary battery kick start circuitry 400 may be implemented in any desired environment. It should also be noted that the aforementioned definitions may apply during the present description.

As shown, the battery kick start circuitry 400 includes a p-channel field effect transistor (FET) 404. In one embodiment, a pulse of current may be sent via an input 402 (e.g., an input of a microcontroller, etc.) to the FET 404. In another embodiment, in response to receiving the pulse from the input 402, the FET 404 may direct the pulse to a diode 406. In yet another embodiment, the diode 406 may direct the pulse current and ensure that the pulse current travels toward the resistors 408 of the battery kick start circuitry 400.

Additionally, in one embodiment, the pulse current may pass through the resistors 408A and 408B of the battery kick start circuitry 400 and may be received by the battery 410. In another embodiment, the resistors 408A and 408B may regulate the current travelling to the battery 410. For example, the resistors 408A and 408B may take the pulse current as input and may output a predetermined current to the battery 410. In yet another embodiment, the resistors 408A and 408B may be dynamically adjusted to control the pulse current received by the battery 410.

Further, in one embodiment, a current voltage of the battery 410 may be increased in response to receiving the pulse current. In another embodiment, a battery charger 412 that had not detected the previous voltage of the battery 410 may detect the increased voltage of the battery 410 as a result of the battery 410 receiving the pulse current. In this way, an input pulse current may trigger detection of the battery 410 by the battery charger 412.

Figure 5:
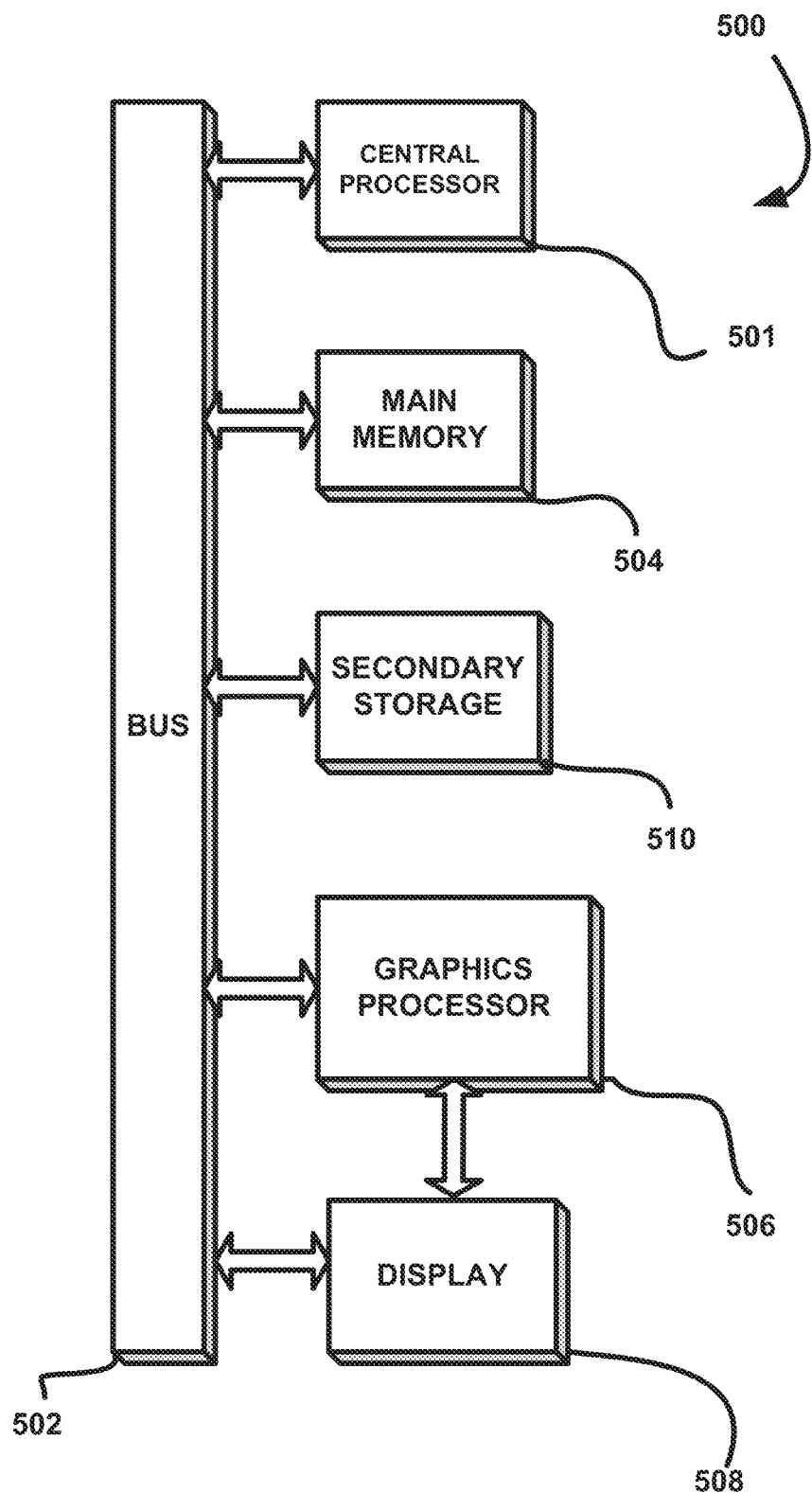
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    detecting, at a module that includes a microcontroller, a voltage of a battery connected to a battery charger, wherein the voltage is below a minimum threshold voltage at which the battery charger detects the battery; and
    sending, by the module, at least one pulse of current to the battery to increase the voltage of the battery above the minimum threshold voltage, wherein the battery charger, once the voltage is above the minimum threshold voltage, detects the battery and begins to charge the battery, wherein the at least one pulse of current is sent from a general purpose input/output (GPIO) port of the microcontroller, and wherein the GPIO port is coupled to a gate of a p-channel field effect transistor (FET) and a first end of a first resistor, a second end of the first resistor is connected to a source of the p-channel FET, and a drain of the p-channel FET is connected to a diode.

2. The method of claim 1, wherein a type of the battery is one of a lead acid battery, a nickel-cadmium (NiCd) battery, a nickel-zinc (NiZn) battery, a nickel metal hydride (NiMH) battery, and a lithium-ion (Li-ion) battery.

3. The method of claim 1, wherein the module is connected between the battery and the battery charger.

4. The method of claim 1, wherein the module is external to the battery and the battery charger.

5. The method of claim 1, wherein the diode is coupled to a pair of resistors that are connected in parallel, and the pair of resistors is coupled to the battery such that the pulse generated by the GPIO port passes through the p-channel FET, diode, and the pair of resistors to force current into the battery.

6. The method of claim 1, wherein the at least one pulse of current includes two or more pulses of current.

7. The method of claim 6, wherein each pulse of current in the two or more pulses of current is transmitted to the battery at a predetermined interval.

8. The method of claim 7, wherein the interval between pulses is greater than or equal to one second.

9. The method of claim 6, wherein a predetermined number of pulses of current are sent to the battery.

10. A system, comprising:
a battery having a voltage below a minimum threshold voltage;
a battery charger configured to detect the battery when a voltage of a battery is above the minimum threshold voltage; and
a circuit for increasing a voltage of the battery above the minimum threshold voltage by sending at least one pulse of current to the battery to increase the voltage of the battery above the minimum threshold voltage,
wherein the circuit includes a microcontroller connected to the battery and the battery charger,
wherein the at least one pulse of current is sent from a general purpose input/output (GPIO) port of the microcontroller to the battery, and
wherein the GPIO port is coupled to a gate of a p-channel field effect transistor (FET) and a first end of a first resistor, a second end of the first resistor is connected to a source of the p-channel FET, and a drain of the p-channel FET is connected to a diode.

11. The system of claim 10, wherein a type of the battery is one of a lead acid battery, a nickel-cadmium (NiCd) battery, a nickel-zinc (NiZn) battery, a nickel metal hydride (NiMH) battery, and a lithium-ion (Li-ion) battery.

12. The system of claim 10, wherein the diode is coupled to a pair of resistors that are connected in parallel, and the pair of resistors is coupled to the battery such that the pulse generated by the GPIO port passes through the p-channel FET, diode, and the pair of resistors to force current into the battery.

13. The system of claim 10, wherein the at least one pulse of current includes two or more pulses of current.

14. The system of claim 10, wherein each pulse of current in the two or more pulses of current is transmitted to the battery at a predetermined interval.

* * * * *